(12) United States Patent
Sonnek

(10) Patent No.: US 12,480,087 B2
(45) Date of Patent: Nov. 25, 2025

(54) FIBER WASH SYSTEM AND METHOD

(71) Applicant: IntegroEnergy Technologies LLC, Lake Crystal, MN (US)

(72) Inventor: Daniel W. Sonnek, Lake Crystal, MN (US)

(73) Assignee: IntegroEnergy Group, Inc., Lake Crystal, SD (US)

( * ) Notice: Subject to any disclaimer, the term of this patent is extended or adjusted under 35 U.S.C. 154(b) by 1127 days.

(21) Appl. No.: 17/366,428

(22) Filed: Jul. 2, 2021

(65) Prior Publication Data

US 2022/0002660 A1 Jan. 6, 2022

Related U.S. Application Data

(60) Provisional application No. 63/048,238, filed on Jul. 6, 2020.

(51) Int. Cl.
| | |
|---|---|
| *C12M 1/00* | (2006.01) |
| *A23J 1/12* | (2006.01) |
| *A23K 10/38* | (2016.01) |
| *A23K 20/147* | (2016.01) |
| *B01D 3/00* | (2006.01) |
| *D21C 5/00* | (2006.01) |
| *D21C 9/06* | (2006.01) |

(52) U.S. Cl.
CPC ............... *C12M 47/10* (2013.01); *A23J 1/12* (2013.01); *A23K 10/38* (2016.05); *A23K 20/147* (2016.05); *B01D 3/001* (2013.01); *D21C 5/005* (2013.01); *D21C 9/06* (2013.01)

(58) Field of Classification Search
None
See application file for complete search history.

(56) References Cited

U.S. PATENT DOCUMENTS

| | | | | |
|---|---|---|---|---|
| 10,875,889 B2 * | 12/2020 | Jakel | ............. | B01D 21/267 |
| 10,926,267 B2 * | 2/2021 | Hora | ............. | A23K 50/80 |
| 11,882,861 B2 * | 1/2024 | Urban | ............. | C12P 7/06 |
| 2009/0035826 A1 * | 2/2009 | Tolan | ............. | C07H 3/02 |
| | | | | 435/165 |
| 2012/0183643 A1 * | 7/2012 | Dale | ............. | C12F 3/10 |
| | | | | 426/31 |
| 2012/0208246 A1 * | 8/2012 | Anton | ............. | C12P 7/16 |
| | | | | 426/31 |
| 2012/0211348 A1 * | 8/2012 | Grady | ............. | B01D 3/148 |
| | | | | 203/42 |
| 2013/0164795 A1 * | 6/2013 | Lowe | ............. | C12P 7/6409 |
| | | | | 426/18 |
| 2015/0211026 A1 * | 7/2015 | Bazzana | ............. | C12P 7/10 |
| | | | | 435/141 |
| 2018/0126302 A1 * | 5/2018 | Gallop | ............. | B01D 29/86 |

FOREIGN PATENT DOCUMENTS

WO WO-2010071987 A1 * 7/2010 ............... C12P 7/10

* cited by examiner

*Primary Examiner* — Thor S Campbell
(74) *Attorney, Agent, or Firm* — Fox Rothschild LLP

(57) ABSTRACT

A system and method for washing and separating fiber in the processing of grains in between the steps of fermentation and distillation is disclosed. Also disclosed is a method for producing a high protein feed.

10 Claims, 2 Drawing Sheets

FIBER WASH SYSTEM AND METHOD

CROSS-REFERENCE TO RELATED APPLICATION

This invention claims priority benefit under 35 U.S.C. § 119(e) to U.S. Provisional Application Ser. No. 63/048,238, filed Jul. 6, 2020, the entire contents of which is incorporated by reference herein in its entirety.

FIELD OF THE DISCLOSURE

This disclosure pertains to a distillation system used in dry mill ethanol facilities. In particular, this invention pertains to a fiber wash apparatus and method for separating and removing the fiber and recovering ethanol between fermentation and distillation.

BACKGROUND OF THE DISCLOSURE

The three main components of the kernel are the bran, endosperm, and germ. The bran holds the corn's fiber, the hard outer layer of the kernel. The endosperm contains the majority of the corn's starch, found on the interior of the kernel. The germ is at the center of the kernel by the bottom tip cap, containing an abundance of proteins and oils.

A corn kernel contains about 75 percent starch, 9 percent protein, 9 percent fiber, 4 percent oil, plus small amounts of ash and sugars. Though a small portion of the bran is convertible to simple sugars that can be utilized by the yeast, the starch is really the only viable fermentable part of the kernel.

In a standard dry-mill ethanol plant, the corn is run through a hammer mill and the ground corn is sent through the fermentation process. Because the other components of the corn—proteins, oils, fiber—are not fermentable, they are not able to be converted into ethanol and instead come through the process in the distillers grain co-product.

However, current dry mill ethanol facilities are designed to grind whole corn or similar grain to fine flour, hydrate, heat, expose to enzymes and ferment all of the ground components including the fiber. The fermented mixture (called "beer") is sent to a distillation system to extract the ethanol for concentration and sale. The material that is removed from the bottom of the first distillation column (beer column) is typically termed whole stillage—a combination of dissolved and undissolved solids. The stillage consists of the non-fermented components of beer—without the ethanol. These components include primarily fiber, protein, fats or oil, yeast bodies, and some ash. Dry mill ethanol plants will mechanically separate some of the water and dissolved solids from the solid particles by using decanters. The liquid portion (thin stillage) is split to feed the evaporators and recycle to the front of the facility.

There have been some efforts to separate the fiber from the protein by mechanical means. Two main systems have been presented to the industry. The first type uses mechanical separation prior to liquefaction. This first system will allow the soluble proteins to continue with the fermentable portion through the plant while the fiber is washed and sent directly to a drying system. While this first process can slightly increase the capacity of fermentation, it can also cause a loss of fermentable materials directly to the fiber dryer or to a cellulosic process added for increased ethanol production. Thus, the yield (gallons per bushel) can be reduced. The first type of system also inherently adds water to the process due to the required washing that causes a mass imbalance in the plant. Additionally, heat losses are realized as significant tankage, pumps, piping and equipment are needed and handle one of the highest temperatures in the process.

A second type of system uses a mechanical separation of the whole stillage. At this point, the maximum fermentation has taken place and yield losses are limited. However, there can still be heat loss and water issues if not handled appropriately.

Thus what is needed is a system and method for washing fiber that minimizes the loss of heat and water from the plant and increases ethanol yield.

SUMMARY OF THE DISCLOSURE

A system for a dry mill ethanol plant is disclosed including: a fermentation vessel coupled to a separating means for separating fiber from protein in fermented grain; a first outlet coupled to the separating means for routing the protein to a distillation column; a second outlet coupled to the separating means for routing the separated fiber to a solvent wash system; a third outlet coupled to the solvent wash system for routing the fiber to a solvent recovery vessel or to a cellulosic process. There also may be a fourth outlet coupled to the solvent recovery system for routing the fiber to a fiber recovery system, which optionally may include a fifth outlet coupled to the solvent recovery system for routing the recovered solvent for reuse (e.g., to a system for capturing ethanol); and a sixth outlet coupled to a fiber dryer for routing the dried fiber to a fiber storage tank.

Also disclosed is a method of recovering fiber from a dry mill ethanol plant including: processing fermented ground grain in a separating means for separating fiber from ground grain, the separating means being positioned between a fermentation vessel for fermenting the ground grain and a distillation column, and washing the separated fiber to obtain washed fiber. The method may further comprise: separating fiber from the protein in the fermented ground grain; and routing the protein to a distillation column and distilling a whole stillage therefrom, and optionally one or more of the following steps: centrifuging the whole stillage to produce thin stillage; evaporating the thin stillage to produce a syrup; routing the syrup to a protein dryer to produce a high protein feed; and routing the high protein feed to a storage tank. Centrifuging the whole stillage may also produce a solids cake, which may be routed to the protein dryer, where it is optionally combined with the syrup, to produce the high protein feed; and then routed to the storage tank. The separated fiber may be washed with a counter-current solvent stream comprising ethanol. The method may further comprise: removing the solvent from the washed fiber; drying the washed fiber; and storing the dried fiber in a storage tank. In an embodiment, method may further include subjecting the washed fiber to a cellulosic process.

A method of making high protein feed in a dry mill ethanol plant is also disclosed. That method includes: processing fermented ground grain in a separating means for separating fiber from ground grain, the separating means being positioned between a fermentation vessel for fermenting the ground grain and a distillation column, separating fiber from protein in the fermented ground grain; routing the protein to a distillation column and distilling a whole stillage therefrom; centrifuging the whole stillage to produce thin stillage; evaporating the thin stillage to produce a syrup; routing the syrup to a protein dryer to produce a high protein feed; and routing the high protein feed to a storage tank.

Centrifuging the whole stillage may also produce a solids cake, which may be routed to the protein dryer, where it is optionally combined with the syrup, to produce a high protein feed; and then routed to a storage tank.

DETAILED DESCRIPTION OF THE DISCLOSURE

Figure 1:
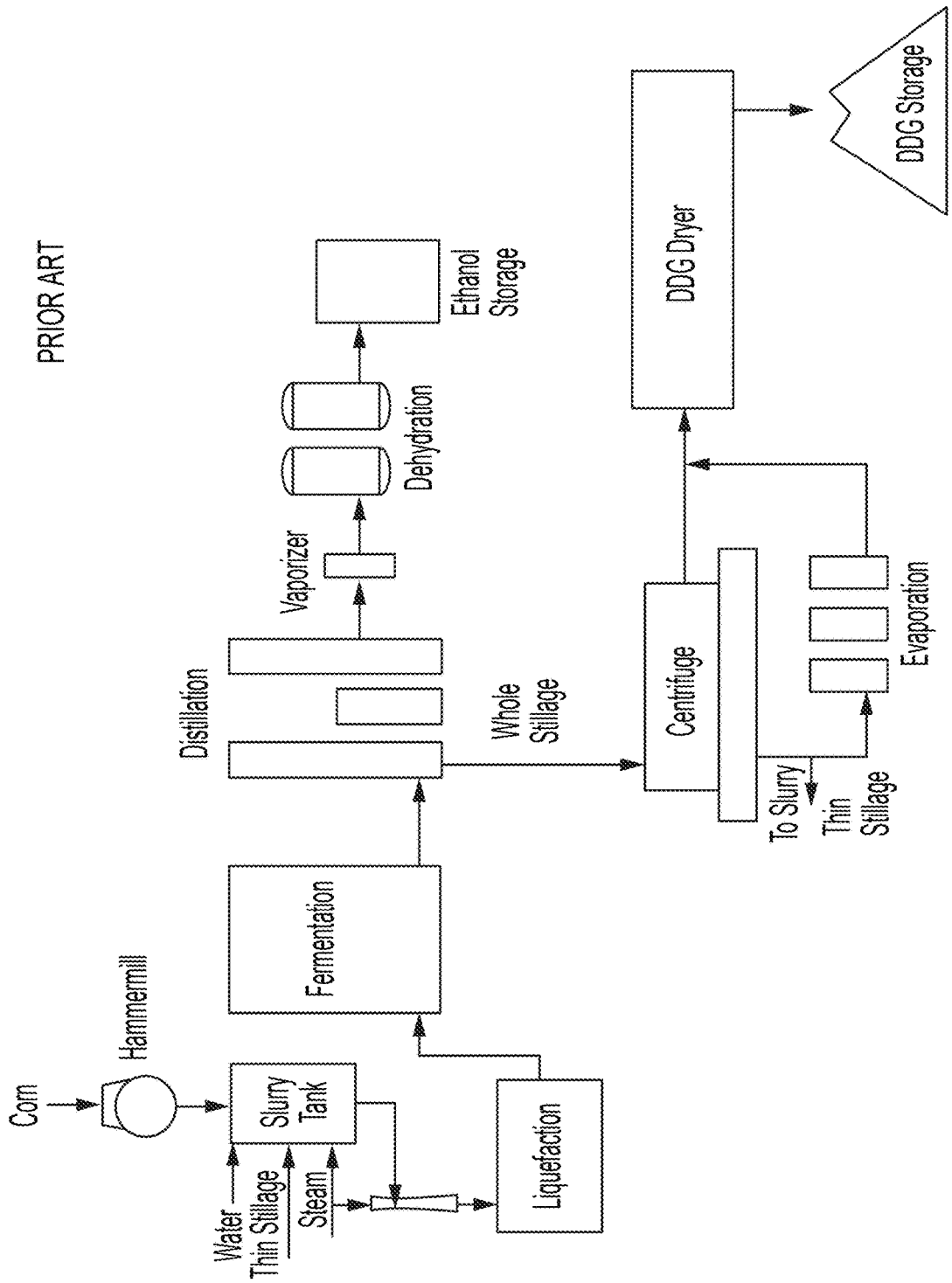
FIG. 1 depicts a conventional system of processing dry mill of whole corn or similar grain.

Unlike conventional systems, the system for a dry mill ethanol plant and method of recovering fiber from a dry mill ethanol plant, disclosed herein, separates the fiber from the protein between fermentation and distillation. The balance of material is then returned to the process prior to distillation. Once the ethanol has been removed from this material, the remaining mixture is termed whole stillage. This whole stillage is typically dewatered and the wet solids are dried and termed dried distillers grains with solubles (DDGS). When the fiber is removed, the remaining solid product/feed (a.k.a DDGS) is has 10-20% higher protein content as compared to typical DDGS. Thus rendering it a high protein feed. Typical DDGS contains about 30% to about 37% by weight protein, while the high protein feed produced according to this disclosure may contain about 40% to about 55%, or about 45% to about 50% by weight protein. Therefore, two new byproducts are available to the ethanol facilities: fiber for sale or to be further processed and high protein feed.

At this stage of the process, the fermentation has been maximized and there is a low percentage of ethanol in the beer. This beer is not flammable and the viscosity is relatively low so separation is reasonably easy. At this point in the process the beer is low temperature (typically around 90° F.) so heat loss is no longer a concern. In the system and process of the disclosure, the equipment does not require insulation. A counter current wash can be accomplished by using an ethanol/water recycle stream produced by distillation as a solvent that can enhance the separation. Nearly all of the ethanol is carried forward to distillation with the protein and that ethanol is removed. The washed fiber may be routed directly into a cellulosic process or into a solvent recovery system, as explained in further detail below, with the ethanol (solvent) routed directly back into the process so it is not lost, and is available for reuse.

An embodiment is directed to a system for a dry mill ethanol plant. The system may include: i) a fermentation vessel coupled to a separating means for separating fiber from protein in fermented grain; ii) a first outlet coupled to the separating means for routing the protein to a distillation column; iii) a second outlet coupled to the separating means for routing the separated fiber to a solvent wash system; and iii) a third outlet coupled to the solvent wash system for routing the fiber to a solvent recovery system. The system may also include a fourth outlet coupled to the solvent washing station for routing the fiber to a solvent recovery system or to a cellulosic process.

When the system includes the fourth outlet coupled to the solvent wash system for routing the fiber to a solvent recovery system, the system further comprises, a fifth outlet coupled to the solvent recovery system for routing the fiber to a fiber recovery system. The system may further include a sixth outlet coupled to the solvent recovery system for routing the recovered solvent for reuse in the ethanol plant, for example, the recovered solvent may be routed to a tank for capturing ethanol. The fiber recovery system may include: a seventh outlet coupled to a fiber dryer for routing the dried fiber to a fiber storage tank for subsequent sale or use.

In an embodiment, the fourth outlet is coupled to the solvent wash system for routing the fiber to a cellulosic process. The cellulosic process herein may be any such cellulosic process system known for use in the art. For example, the cellulosic process may provide a conventional cellulosic process comprised of pH adjustment, heating, energy recovery, enzyme addition, fermentation, and distillation unit operations. This process breaks down the cell structure of the fiber so that it can be converted into sugars that can be fermented similarly to conventional ethanol processing. This step allows the system of the disclosure to be compact and is an alternative to solvent recovery processing. When the washed fiber is transferred to the cellulosic process, cellulosic fermentation may convert the broken down fiber into ethanol, which is then stored for sale.

The solvent wash system used herein may be any such solvent wash system known for use in the art. The solvent wash system may comprise one or more means for separation connected in series with a counter current wash comprising ethanol running through the connected series. The means of separation may be selected from centrifuge, decanter, flotation, settling, and any combination thereof. The solvent wash system may comprise one or more screens and one or more drums (also referred to as a tank or vessel) connected in series with a counter current wash comprising ethanol running through the connected series. In an embodiment, one to seven screens and an equivalent number of means of separation are connected with a series of piping and inlets allowing the washed fiber to move through each screen and into each drum where it is washed by a solvent stream comprising ethanol. For example, in the solvent wash system, protein and fat are removed from the fiber by washing with a solvent in a counter current wash in multiple steps (e.g., through a series of screens, drums and/or means of separation). The solvent may include a mixture of ethanol and water. The solvent washing station may apply a counter current wash using an ethanol/water recycle stream. That ethanol/water recycle stream may be produced by distillation in another part of the processing and fed back into the solvent washing station.

The solvent recovery system used in the system herein may be any such system known for use in the art. For example, the washed fiber may be processed with condensate to further wash any residual solvent from the fiber in a counter-current, staged system. The condensate will absorb the solvent and be pumped or cycled back to the initial steps of the ethanol processing plant so it may be recovered and reused. The condensate may be comprised of water produced by evaporators or similar equipment in the ethanol plant used as a recycle stream.

The dryer used in the system herein may be any such dryer known for use in the art for drying fiber. For example, a rotary drum dryer can be employed to remove the remaining moisture from the fiber. By removing the moisture, the shelf life of the fiber is enhanced.

The fiber storage tank used in the system herein may be any such tank known for use in the art. For example, a silo or bunker can be used to store the dried fiber until it can be loaded out in bulk via truck or rail.

The system includes a fermentation vessel coupled to a separating means for separating fiber from protein in fermented grain. The separating means may separate the liquid portion of the beer (e.g., ethanol, water and protein) from the fiber, for example, with the use of one or more screens known for use in the art. The liquid portion of the beer that has been separated may be routed for reuse in the ethanol plant with no additional processing. The separated fiber is still mixed or contaminated with residual oil and protein. The separated fiber is then routed to the solvent wash system to remove the residues and provide a cleaner fiber.

The fermentation vessel used in the system herein may be any such vessel, tank or drum known in the art for use in fermenting grain.

The separating means may be any appropriate solids/liquid separation equipment including but not limited to: DSM (wedgewire screens), centrifuges, decanters, etc. In an embodiment, the separating means is one or more screens, e.g., DSM screens, which have low capital and operational costs, footprint, and ease of staging.

Also disclosed is a first outlet coupled to the separating means for routing the protein to a distillation column. The distillation column used in the system herein may be any such distillation column known for use in the art. For example, any beer (stripping) column that may already be used in an ethanol processing plant.

The system includes a second outlet coupled to the separating means for routing the separated fiber to a solvent wash system.

Each of the outlets is a direction or pathway through which the component or stream is routed and/or processed, via, e.g., a pump, valve, piping, etc. Each outlet may be made of different materials, of the same material, of different lengths, or of the same length. Each outlet may be constructed from metal, plastic or any other material known for use in the art. Each outlet may be a piping system with one or more inlets and/or outlets.

Another embodiment is a method of recovering fiber from a dry mill ethanol plant. That method may include processing fermented ground grain in a separating means to separate the fiber from the protein, and washing the separated fiber to obtain a washed fiber. The separating means is positioned between a fermentation vessel and a distillation column.

The method of recovering fiber from a dry mill ethanol plant may include: i) providing fermented ground grain into a separating means having a first end coupled to a fermentation vessel and a second end coupled to separating means for separating fiber from protein in fermented grain; ii) separating fiber from the protein in the fermented grain; iii) routing the protein to a distillation column for further processing; and iv) and washing the separated fiber. The method may optionally further comprise: distilling a whole stillage in the distillation column; centrifuging the whole stillage to produce thin stillage; evaporating the thin stillage to produce a syrup; routing the syrup to a protein dryer to produce a high protein feed; routing the high protein feed to a storage tank; viii) washing the fiber with a counter-current solvent stream; removing the solvent from the washed fiber or subjecting the washed fiber to a cellulosic process; and drying the fiber. The method may further include: xi) storing the fiber in a storage tank for sale or use. In an embodiment, centrifuging the whole stillage produces thin stillage and a solid cake. The solid cake may be routed directly to the protein dryer to produce a high protein feed, and then to the storage tank.

The steps of centrifuging the whole stillage may also produce a solids cake, which may be routed to the protein dryer, where it may be optionally combined with the syrup, to produce a high protein feed; and then routed to a storage tank. The solids cake is a compact thick solid, which has a high protein content and which may also contain fiber, fats or oil, and optionally also yeast bodies, and some ash, The syrup is a concentrated thin stillage, which may contain fiber, protein, fats or oil, and optionally also yeast bodies, and some ash, after water has been removed through evaporation.

Another embodiment disclosed herein is a method of making high protein feed in a dry mill ethanol plant comprising: i) processing fermented ground grain in a separating means for separating fiber from ground grain, the separating means being positioned between a fermentation vessel for fermenting the ground grain and a distillation column; ii) separating fiber from protein in the fermented ground grain; iii) routing the protein to a distillation column and distilling a whole stillage therefrom; iv) centrifuging the whole stillage to produce thin stillage and a solids cake; v) evaporating the thin stillage to produce a syrup; vi) routing the solids cake to a protein dryer to produce a high protein feed; and vii) routing the high protein feed to a storage tank. The method may also include the step of: routing the syrup to the protein dryer to combine with the solids cake to produce the high protein feed; and routing the high protein feed to a storage tank.

Referring now to FIG. 1, a conventional system of processing dry mill of whole corn and similar grains is depicted. The plant grinds whole corn or similar grain to fine flour in the hammermill, then hydrate, heats, and exposes the ground grain to enzymes and ferments all of the ground components including the fiber. The fermented mixture (called "beer") is sent to a distillation system (distillation, vaporizer, dehydration, and storage) to extract the ethanol for concentration and sale. The material that is removed from the bottom of the first distillation column (beer column) is typically termed whole stillage—a combination of dissolved and undissolved solids. The stillage consists of the non-fermented components of beer—without the ethanol. These components include primarily fiber, protein, fats or oil, yeast bodies, and some ash. Dry mill ethanol plants will mechanically separate some of the water and dissolved solids from the solid particles by using decanters. The liquid portion (thin stillage) is split to feed the evaporators and recycle to the front of the facility and to a slurry tank.

The whole stillage (a combination of dissolved and undissolved solids) is transported to a centrifuge where the undissolved solids are separated and transported to a DDG dryer (dried distillers grains with solubles). A stream containing just dissolved solids, called thin stillage, is concentrated by evaporating off the water, leaving a more concentrated stream, which is fed to the DDG dryer and DDG storage together with the dissolved solids from the centrifugation process. Current fiber separation systems are located after liquefaction or after the beer column (whole stillage process).

Figure 2:
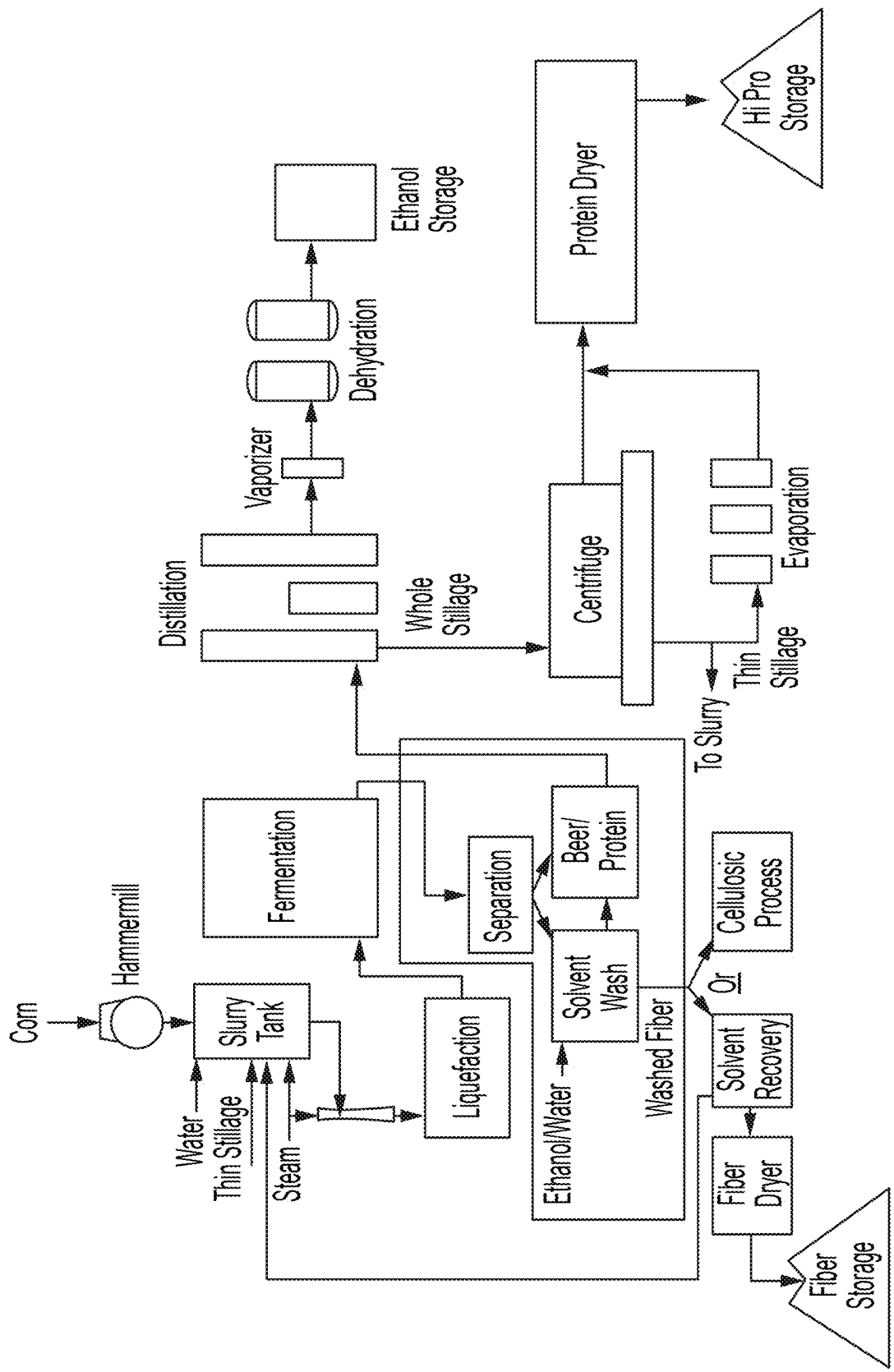
FIG. 2 depicts an exemplary system and method of the disclosure.

Referring now to FIG. 2, a system and process of the disclosure is shown. After the grain, e.g., corn, is ground in the Hammermill, sent through the Slurry Tank and Liquefaction, and fermented in the Fermentation vessel, a series of processing steps are executed before the stream is sent to the distillation system to extract the ethanol for concentration and sale (i.e., Distillation, Vaporization, Dehydration and Ethanol Storage). Just after Fermentation, there is a low percentage of ethanol in the beer typically from about 15 to about 20%. This beer is not flammable and the viscosity is relatively low (typically less than about 10 cP). Separation of the fiber from the ground corn is achievable by any known separation equipment for separating liquids and solids. At this point in the process, at the end of Fermentation, the beer is also at a relatively low temperature—approximately 90° F. Therefore, heat loss is no longer a concern, which directly confers plant efficiency. In other processes, when high temperatures are required, pipe and equipment insulation are required to prevent loss of heat.

After Separation, in Solvent Wash, a counter current wash may be applied to the separated fiber by using an ethanol/water recycle stream. That ethanol/water recycle stream may be produced by Distillation and fed back into the Solvent Wash as a solvent to enhance separation. Nearly all of the ethanol is then collected and carried forward to Distillation with the protein and then that ethanol is removed through Distillation, Vaporizer and Dehydration, and then stored. All or part of the Washed Fiber may be transferred directly into Cellulosic Process that breaks down the fiber so enzymes can convert it to a sugar. In the cellulosic process, the yeast in the cellulosic fermentation can convert the broken down fiber to ethanol.

Alternatively, all or part of the Washed Fiber may be transferred into a solvent recovery system (Solvent Recovery), in which case, the ethanol (solvent) is captured, removed and transferred back into the initial corn grinding process. Nearly 100% of the ethanol is recovered in either of the foregoing processes. After Solvent Recovery, the Washed Fiber may be routed to a dryer (Fiber Dryer) and stored in the Fiber Storage making it available for new and other proven uses.

From the Fiber Storage, the fiber product may have multiple post-sale uses and applications. It can be used as a cattle feed, ideally suited for the beef and dairy market. Removal of the fiber between Fermentation and Distillation from the starch stream that goes to ethanol production also changes the composition of the existing distillers grain, making it a higher-protein feed. In the process of the disclosure, more fiber is removed than in conventional processing and thus the remaining protein feed has a higher protein content, "high protein feed."

In addition, the bran can be used as a feedstock for cellulosic ethanol. Bran, which includes the fiber, is made up mostly of cellulosic material that can be converted into simple sugars, the key ingredient for the fermentation process. With the bran separated from the stream prior to distillation, a dedicated conversion and fermentation system may optionally be put in place to produce cellulosic ethanol—another added-value aspect for ethanol producers. In this process, the bran may be processed via separation means, solvent wash system, and then the washed fiber routed to the cellulosic process involving, e.g., any combination of pH adjustment, heating, energy recovery, enzyme addition, fermentation, and distillation unit operations. This process breaks down the cell structure of the fiber so that it can be converted into sugars that can be fermented in similar process as conventional ethanol processing.

Optionally, in an embodiment, the fiber product may be transferred to a boiler and burned in a biomass boiler system to provide power to the ethanol plant, reducing fossil fuel consumption. Separating the fiber after fermentation but before distillation may also result in a BTU-per-gallon reduction in energy use at the ethanol plant. For example, bran typically contains about 7,000 BTUs per pound, which when used as a power source for the process, could lead to a 12 to 15 percent reduction in energy use at an ethanol plant.

Although the present invention has been described with reference to various aspects of the invention, those of ordinary skill in the art will recognize that changes may be made in form and detail without departing from the spirit and scope of the invention.

What is claimed:

1. A system for a dry mill ethanol plant comprising:
a fermentation vessel coupled to a separating means for separating fiber from protein in fermented grain;
a first outlet coupled to the fermentation vessel for routing the fermented grain to the separating means;
a second outlet coupled to the separating means for routing the protein to a distillation column;
a third outlet coupled to the separating means for routing the separated fiber to a solvent wash system;
a fourth outlet coupled to the solvent wash system for routing the fiber to a solvent recovery system; and
a fifth outlet coupled to the solvent recovery system for routing the fiber to a fiber recovery system,
wherein the fiber and the protein are separated in the separating means after fermentation and prior to being routed to the solvent wash system and the distillation column, respectively.

2. The system of claim 1, further comprising a sixth outlet coupled to the solvent recovery system for routing the recovered solvent for reuse.

3. The system of claim 2, wherein the recovered solvent is routed to a tank for capturing ethanol.

4. The system of claim 1, further comprising a washing stream comprising ethanol, wherein the washing stream is coupled to the solvent wash system.

5. The system of claim 1, wherein the fiber recovery system comprises a fiber dryer coupled to a fiber storage vessel.

6. The system of claim 1, wherein the solvent wash system comprises one or more screens and means of separation connected in series with a counter current wash comprising ethanol.

7. A system for a dry mill ethanol plant comprising:
a fermentation vessel coupled to a separating means for separating fiber from protein in fermented grain;
a first outlet coupled to the fermentation vessel for routing the fermented grain to the separating means;
a second outlet coupled to the separating means for routing the protein to a distillation column;
a third outlet coupled to the separating means for routing the separated fiber to a solvent wash system;
a fourth outlet coupled to the solvent wash system for routing the fiber to a solvent recovery system; and
a fifth outlet coupled to the solvent wash system for routing the fiber to a cellulosic process,
wherein the fiber and the protein are separated in the separating means after fermentation and prior to being routed to the solvent wash system and the distillation column, respectively.

8. The system of claim 7, wherein the solvent wash system comprises one or more screens and means of separation connected in series with a counter current wash comprising ethanol.

9. The system of claim 7, further comprising a washing stream comprising ethanol coupled to the solvent wash system.

10. The system of claim 7, wherein the cellulosic process is configured to apply one more of pH adjustment, heat, enzyme addition, and fermentation.

* * * * *